US010691598B2

(12) United States Patent
Quere et al.

(10) Patent No.: US 10,691,598 B2
(45) Date of Patent: Jun. 23, 2020

(54) METHOD OF OPTIMIZATION OF CACHE MEMORY MANAGEMENT AND CORRESPONDING APPARATUS

(75) Inventors: Thierry Quere, Montfort sur Meu (FR); Renaud Rigal, Cesson-Sevigne (FR); Florent Fresnaye, Saint Aubin du Cormier (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 521 days.

(21) Appl. No.: 13/698,307

(22) PCT Filed: May 16, 2011

(86) PCT No.: PCT/EP2011/057899
§ 371 (c)(1),
(2), (4) Date: Feb. 14, 2013

(87) PCT Pub. No.: WO2011/144576
PCT Pub. Date: Nov. 24, 2011

(65) Prior Publication Data
US 2013/0198314 A1 Aug. 1, 2013

(30) Foreign Application Priority Data
May 17, 2010 (EP) .................................... 10305518

(51) Int. Cl.
*G06F 12/00* (2006.01)
*G06F 12/0813* (2016.01)
*G06F 12/0888* (2016.01)
*G06F 12/08* (2016.01)

(52) U.S. Cl.
CPC ...... *G06F 12/0813* (2013.01); *G06F 12/0888* (2013.01); *G06F 12/08* (2013.01)

(58) Field of Classification Search
CPC ... G06F 12/0813; G06F 12/0888; G06F 12/08
USPC ........................................... 711/233; 709/213
See application file for complete search history.

(56) References Cited

U.S. PATENT DOCUMENTS

| | | | |
|---|---|---|---|
| 6,223,256 B1 | 4/2001 | Gaither et al. | |
| 6,742,033 B1 | 5/2004 | Smith et al. | |
| 6,957,212 B2 | 10/2005 | Peng | |
| 7,076,500 B2 | 7/2006 | Gallant et al. | |
| 7,236,988 B2 | 6/2007 | Li et al. | |
| 7,330,938 B2 | 2/2008 | Nenov et al. | |
| 2002/0087797 A1 | 7/2002 | Adrangi | |
| 2006/0064549 A1* | 3/2006 | Wintergerst | .................. 711/134 |
| 2006/0085519 A1 | 4/2006 | Goode et al. | |

(Continued)

FOREIGN PATENT DOCUMENTS

| | | |
|---|---|---|
| CN | 1334938 | 2/2002 |
| CN | 1934542 | 3/2007 |

(Continued)

*Primary Examiner* — Mardochee Chery
(74) *Attorney, Agent, or Firm* — Volpe and Koenig, P.C.

(57) ABSTRACT

A method for managing cache memory in a user device is disclosed. The method comprises stagewise excluding adding data to the cache memory as cache memory fill level increases, the stagewise excluding comprising determining, for each successive stage of cache memory fill level, exclusion of the data from being added to the cache memory according to rules of exclusion of adding of data to the cache memory that are increasingly restrictive.

14 Claims, 4 Drawing Sheets

(56) References Cited

U.S. PATENT DOCUMENTS

| | | |
|---|---|---|
| 2006/0095676 A1 | 5/2006 | Dzierzon et al. |
| 2006/0230234 A1 | 10/2006 | Bentolila et al. |
| 2008/0151817 A1* | 6/2008 | Fitchett et al. ............... 370/329 |
| 2009/0182836 A1 | 7/2009 | Aviles et al. |
| 2009/0193064 A1* | 7/2009 | Chen et al. ................... 707/204 |
| 2011/0145501 A1* | 6/2011 | Steely et al. ................. 711/121 |

FOREIGN PATENT DOCUMENTS

| | | |
|---|---|---|
| CN | 101595458 | 12/2009 |
| GB | 2418108 | 3/2006 |
| JP | 11065915 | 3/1999 |
| JP | 2000137642 | 5/2000 |
| JP | 2003044346 A | 2/2003 |
| JP | 2003196144 A | 7/2003 |
| JP | 2008009618 | 1/2008 |
| KR | 609211 | 8/2006 |
| RU | 2238584 C2 | 10/2004 |
| WO | WO0034870 | 6/2000 |
| WO | WO2005091147 | 9/2005 |
| WO | 2007102969 A2 | 9/2007 |

\* cited by examiner

METHOD OF OPTIMIZATION OF CACHE MEMORY MANAGEMENT AND CORRESPONDING APPARATUS

This application claims the benefit, under 35 U.S.C. § 365 of international Application PCT/EP2011/057899, filed May 16, 2011, which was published in accordance with POT Article 21(2) on Nov. 24, 2011 in English and which claims the benefit of European patent application No. EP 10305518.2, filed May 17, 2010.

1. FIELD OF INVENTION

The present invention generally relates to accessing digital data received from a communications network, and more particularly, to a method and an apparatus for optimizing access to that data.

2. TECHNICAL BACKGROUND

Dedicated devices for accessing digital data services such as Internet Protocol Set Top Boxes for rendering of audio-visual services (e.g. IPTV-STBs) have minimal hardware resources in order to reduce production costs and ensure a competitive market price. In particular, processing and memory resources are tailored to the strictly needed. But with ever enhanced service offers and improved graphical service offering presentation, service portals, that are the entry point to access a service offering, become more and more complex and demanding with relation to the limited resources of the dedicated devices. Service portals typically comprise a hierarchy of menus and pages, comprising not only text, but also voluminous images and scripts that must be executed. All of this information must be downloaded from a remote server in a network before being rendered, which slows down the reaction time of the devices. Important processing and memory resources are required, in order to ensure sufficient reactivity of the devices for users, which conflicts with a requirement to keep the production costs of the devices low. According to prior art solutions, local cache memory is used to speed up the rendering of menus and pages, so that information that is needed and that has already been downloaded once is fetched from local cache memory instead of being downloaded each time it is needed. But ever increasing enhancement of service offering results in very quickly filling of cache memory when a user navigates among the pages of a service offering access portal. Working with a completely filled cache that is managed according to prior art cache management is problematic because it introduces undesirable delays; each time new data is to added to a full cache, a so-called 'best candidate' must be found to be removed from cache, that does not penalize the reactivity of the device too much. Prior art solutions try to optimize this search for a 'best candidate' by applying different cache management policies related to time stamping of the last use of data stored in cache, and removing relatively 'old' information from cache. But cache management also introduces delays. In some situations, the delay needed for the cache management is higher than the delay that is caused by direct downloading of the required data from the network; a situation which is difficult to evaluate beforehand. In addition, the 'best candidate' chosen according to a specific cache management policy is not always the best choice; for example, it is not desirable to remove from cache memory the pages and resources of a main service offering access portal application that functions as an entry point for a user to access a service offer, even if the data related to that main service offering access portal is the 'oldest' data in cache.

There is thus a need for an optimized cache memory management method where delays introduced by management of full cache memory are avoided and removal from cache memory of important information is avoided.

3. SUMMARY OF THE INVENTION

The present invention aims at alleviating some of the inconveniences of prior art.

The invention proposes a solution for cache memory management that avoids among others the aforementioned drawbacks of prior art cache memory management. The invention comprises application of different cache memory management policies according to data origin.

In order to optimize cache memory management, the invention proposes a method of optimization of cache memory management implemented in a user receiver device, possibly for reception of audiovisual services and possibly connected to a network, the method comprising stagewise exclusion of adding of data to said cache memory as cache memory fill level increases, and said exclusion of adding being determined, for each successive stage of cache memory fill level, according to rules of exclusion of adding of data to said cache memory that are increasingly restrictive as a function of origin and type of data.

According to a variant embodiment of the invention, the method further comprises a step of exclusion of adding of the data to the cache memory if cache memory fill level is higher than a first stage of cache memory fill level that is lower than a maximum stage of cache memory fill level.

According to a variant embodiment of the invention, the method further comprises a step of, maintaining a list of preferred service offering providers in said receiver device, and determination if a service provider from which said data to add originates is in said list; and if it is determined that the service offering provider is not in the list and cache memory fill level is under a second stage of cache memory fill level that is lower than the first stage of cache memory fill level, and if it is determined that a type of the data is in a list of preferred data types, the list of preferred data types being present in the receiver device, adding of the data to the cache memory.

According to a variant embodiment of the invention, the method further comprises a step of, if the cache memory fill level is under a third stage of cache memory fill level that is lower than the second stage of cache memory fill level, adding of the data to the cache memory.

According to a variant embodiment of the invention, the list of preferred data types comprises an image type.

According to a variant embodiment of the invention, the list of preferred data types comprises an executable script type.

According to a variant embodiment of the invention, the determination if the service offering provider from which the data originates is in the list of preferred service offering providers, is based on a comparison of a Unified Resource Locator present in the request with the Unified Resource Locators of the preferred service offering providers in the list of preferred service offering providers.

According to a variant embodiment of the invention, the determination if the service offering provider from which the data originates is in the list of preferred service offering providers, is based on a comparison of an Internet Protocol address present in the request, indicating an origin of the data, with Internet Protocol addresses of the preferred service offering providers in the list of preferred service offering providers.

The invention also concerns a device for management of cache memory, the device comprising a controller (111, 120) for stagewise exclusion of adding of data to the cache memory as cache memory fill level increases, and the exclusion of adding being determined, by the controller (111, 120), for each successive stage of cache memory fill level, according to rules of exclusion of adding of data to said cache memory that are increasingly restrictive as a function of origin and type of data.

According to a variant embodiment of the device, the controller further determines exclusion of adding of the data to the cache memory if cache memory fill level is higher than a first stage of cache memory fill level that is lower than a maximum stage of cache memory fill level.

According to a variant embodiment of the device, the controller further comprises means to maintain a list of preferred service offering providers, and means for determining if a service provider from which the data to add originates is in the list, and means for determination if the service offering provider from which the data to add is not in the list and cache memory fill level is under a second stage of cache memory fill level that is lower than the first stage of cache memory fill level, and if it is determined by the controller that a type of the data is in a list of preferred data types, the list of preferred data types being present in the device, and on the affirmative, the controller adds the data to the cache memory.

According to a variant embodiment of the device, the controller further comprises means to determine if the cache memory fill level is under a third stage of cache memory fill level that is lower than the second stage of cache memory fill level, and on the affirmative, the controller adds the data to the cache memory.

4. LIST OF FIGURES

More advantages of the invention will appear through the description of particular, non-restricting embodiments of the invention.

The embodiments will be described with reference to the following figures.

Figure 3:
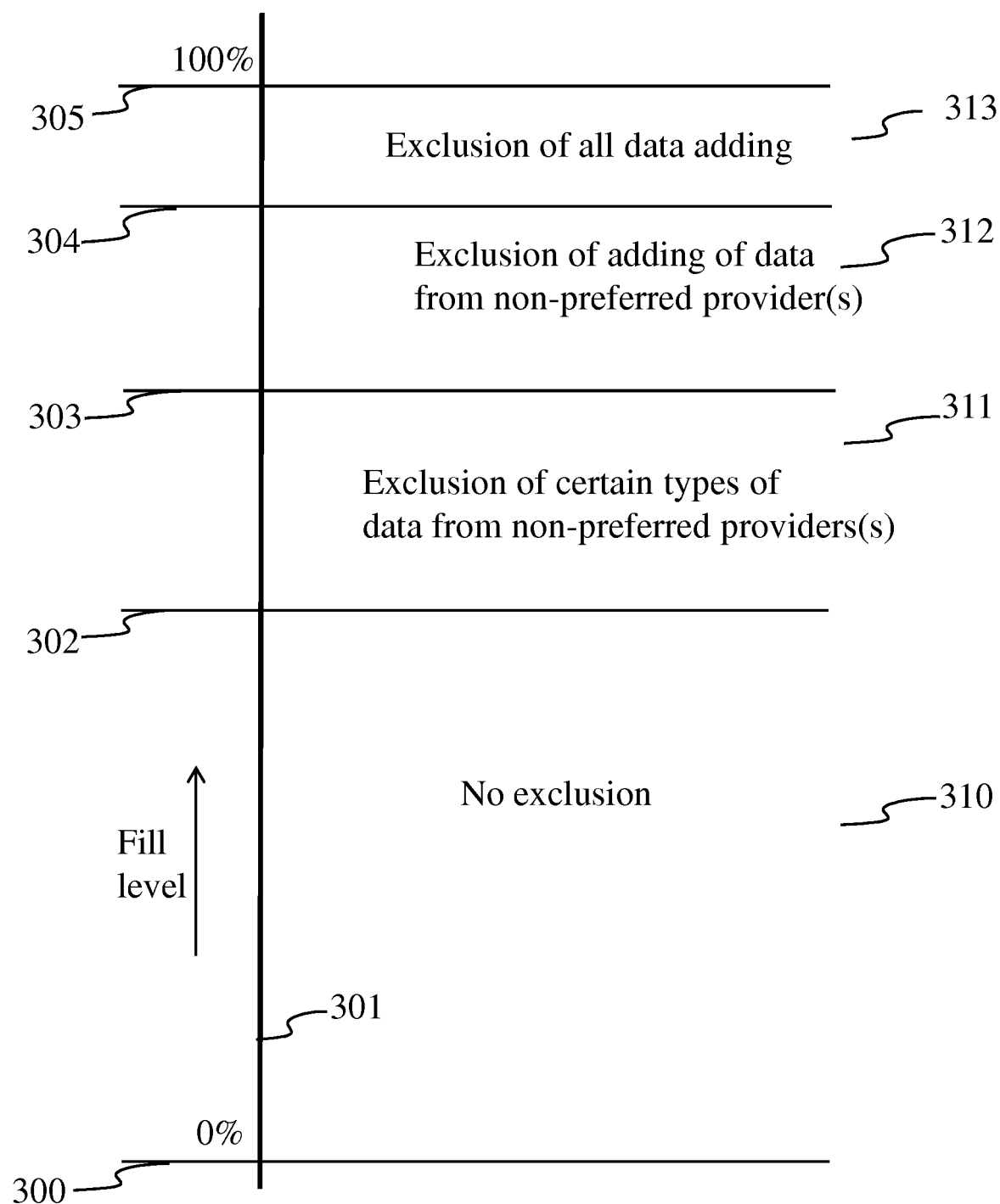

FIG. 3 diagrammatically shows progressive exclusion of data adding to cache memory as a function of various parameters, according to various particular embodiments of the invention.

Figure 1:
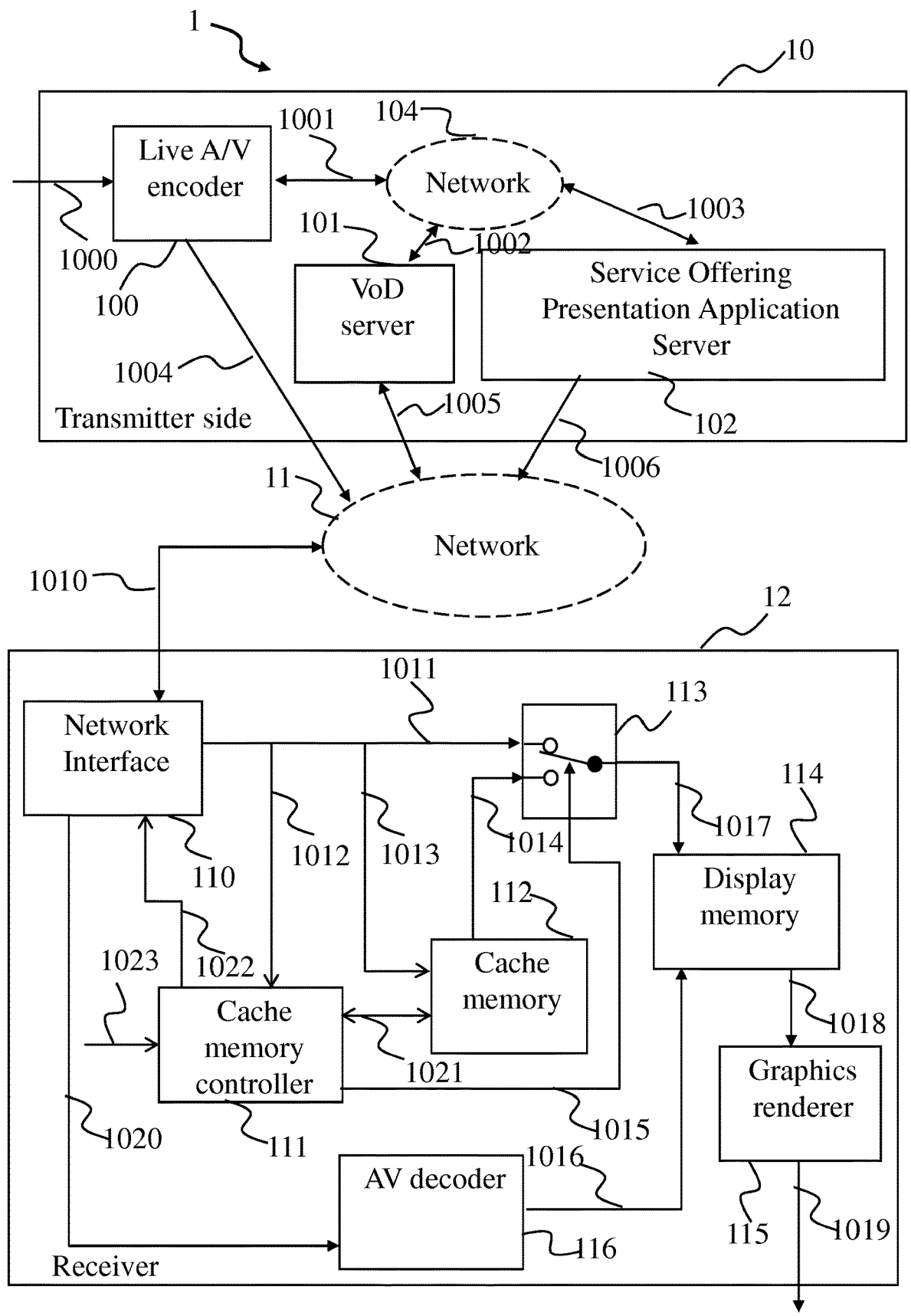
FIG. 1 shows a particular embodiment of the invention, illustrated by means of network-interconnected devices.
Figure 2:
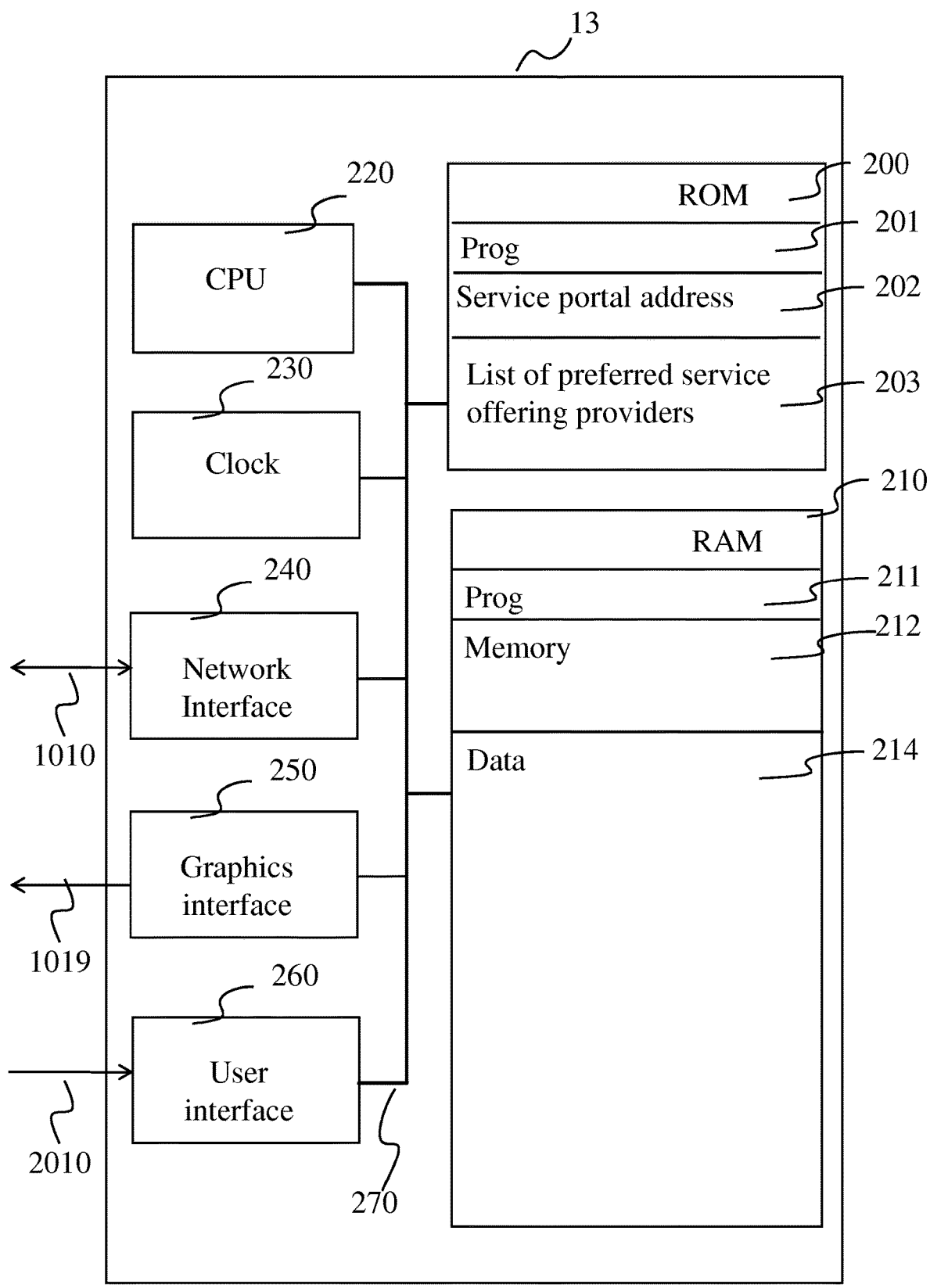
FIG. 2 shows a variant embodiment of the invention in a user receiver device with a different architecture than the user receiver device of FIG. 1.
Figure 4:
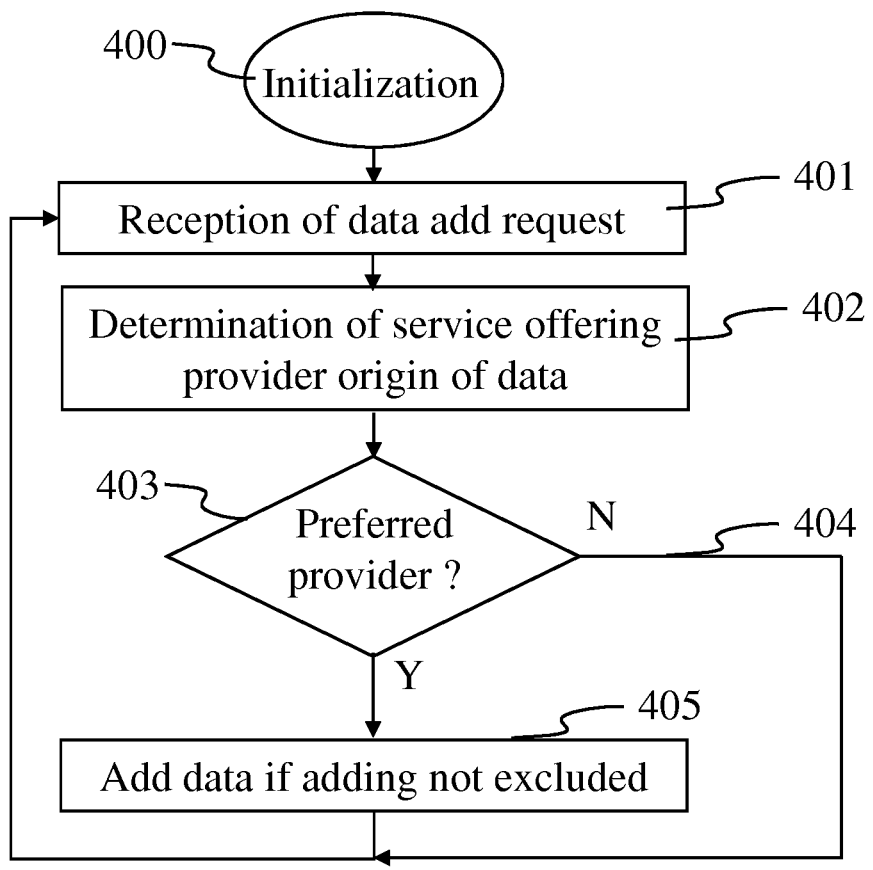

FIG. 4 shows an algorithm implementing a particular embodiment of the method of the invention, implemented for example by the user receiver device of FIG. 1, or by the user receiver device of FIG. 2.

5. DETAILED DESCRIPTION OF THE INVENTION

FIG. 1 shows a particular embodiment of the invention in an audiovisual user receiver device 12 that is connected to a network 11 via a connection 1010 providing the user receiver device 12 with a single audiovisual service offering comprising live- (1004) and Video on Demand (VoD) (1005) audiovisual services.

Transmitter side 10 comprises a live audio and/or video encoder 100, a VoD server 101, and a service offering presentation application server 102, e.g. a web application server providing HTML-based (Hypertext Markup Language) web applications presenting web pages giving access to a service offering. These are connected to an internal network 104, live A/V encoder 100 via connection 1001, VoD server 101 via connection 1002, and service offering presentation application server 102 via connection 1003. Live A/V encoder 100 receives its input stream from an external device (not shown) via connection 1000. It encodes received live transmissions in an encoding- and transport format that can be received and decoded by receiver 12 (e.g. MPEG2TS for Motion Picture Expert Group 2, Transport Stream). These live transmissions are provided by A/V decoder 100 over network 11 via connection 1004. A VoD server 101 provides receiver 12 with video on demand services via connection 1005 over network 1005. A service offering presentation application server 102 provides receiver 12 with a user interface (UI) application (hereafter referred to as 'data') via connection 1006 to network 11, which gives receiver 12 the possibility to list the service offering and to choose a particular live or VoD service for audiovisual rendering.

On the receiver side 12, the receiver 12 comprises an input device (not shown) allowing a user to interact with the receiver. It further comprises a network interface 110 that is connected to network 11 via connection 1010. A/V decoder 116 allows the receiver 12 to decode audiovisual services received from the network interface 110 via a connection 1020. The output of the A/V decoder 116 is connected to display memory 114 via connection 1016, which is in turn connected via connection 1018 to graphics renderer 115, which outputs its content to an audiovisual rendering device (not shown) via connection 1019. The receiver 12 further comprises a cache memory controller 111, a cache memory 112, and a switch 113.

Cache memory controller operates switch 113 via connection 1015 in order to provide, via connection 1017, data to display memory 114 either directly received via connection 1011 to network interface 110 from the network 11 or from cache memory 112 when the data was previously received and stored in the cache memory. To this end, cache memory controller is connected to network interface 110 via connection 1012, and is connected to cache memory via connection 1021. Cache memory controller 111 receives requests for data on connection 1023. Cache memory controller 111 is further connected to network interface 110 via connection 1022 which allows it to transmit connection instructions to network interface 110 to download data that is not available in cache memory 112. Cache memory 112 is connected to network interface 110 via connection 1013 and connects to switch 113 via connection 1014.

For reasons of readability, some components that might be needed for the functioning of receiver 12 are voluntary not shown. This comprises for example a memory to store a list of preferred service offering providers, a device controller for controlling the operation of the device, for example to turn it on or off, change channel, change audio volume, and so on. Specific components that are not shown provide the requests for data that are received by the cache controller 111 via connection 1023.

FIG. 1 is illustrated with only one service provider and only one receiver device. Of course, the invention is also applicable to an environment where more than one service provider and/or more than one receiver device are used.

According to a variant embodiment of the invention, the data that is stored in cache is part of a service offering presentation application that is downloaded by receiver device 12 from the network 11 and service offering presentation application server. For example, if the invention is used in an Internet Protocol based environment, the data that is stored in cache memory are part of web application pages that are part of a service offering access portal giving the user of receiver device 12 access to an offering of audiovisual services.

According to a variant embodiment of the invention, more than one service provider provides an offering of audiovisual services to a receiver device according to the invention. One of these service providers may be considered as being a privileged audiovisual service offering provider after determination that the service provider is present in a list of privileged service offering providers. Then, the invention applies different caching policies, i.e. different rules of exclusion for adding of data to the cache, according to the audiovisual service offering provider from which the data originates. According to a variant embodiment, determination of privileged audiovisual service offering provider is based on an address used to retrieve the data, for example an IP address. According to a variant embodiment, determination if an audiovisual service offering provider is in a list of privileged audiovisual service offering providers is based on a comparison of a resource locator used to retrieve the data, such as an URL (Uniform Resource Locator). As an example, the URL contains the name of the privileged audiovisual service offering provider, or any other identifier identifying the privileged audiovisual service offering provider. According to yet another variant embodiment of the invention, distinction between data to add and not to add is based on the type of service that the data relates to, for example live or Video on Demand type services. As an example, it can be advantageous to consider data related to a service offering provider that offers live services as originating from a preferred provider, when a user uses his receiver in particular to receive this type of services. On the other hand, it can be advantageous to rather consider data related to a service offering provider offering Video on Demand services as data originating from a preferred provider, when a user rather used his receiver in particular to receive Video on Demand services. According to a particular embodiment of the invention, the previous variants are combined, which is advantageous in certain situations of use, for example when a user uses his receiver mostly to receive live services from a first audiovisual service offering provider, and to receive Video on Demand services from a second audiovisual service offering provider. According to a variant embodiment of the invention, it is possible to tailor the distinction between preferred and non-preferred providers to the way the receiver is being used. According to a variant embodiment, this distinction between data that is considered by the receiver as originating from a non-preferred provider and data that is considered originating from a preferred provider is fixed in the receiver by the manufacturer or by the audiovisual service offering provider that sold or hires the receiver as part of a package including a subscription to a service offering. This has the advantage for the audiovisual service offering provider to ensure that the receiver's cache memory management is optimized to store data originating from his preferred audiovisual service offering provider, which thus results in high reactivity of the receiver when the subscriber navigates through the access portal of his preferred audiovisual service offering provider. According to a variant embodiment of the invention, this distinction between what is considered to be originating from a preferred or a non-preferred audiovisual data offering provider is determined by the receiver itself, based on self-analysis of the use of the receiver.

According to a variant embodiment of the invention, the invention comprises a step of stagewise exclusion of adding of data to the cache, for example at one stage of cache fill level, data originating from a non-preferred audiovisual service offering provider of at least one data type (see FIG. 3, zone 311) is excluded from being added to the cache memory. This feature allows among others to avoid very fast filling of cache memory with voluminous data. Typically, such a situation occurs when a user is navigating in a VoD service offering presentation application that typically comprises many voluminous images, movie trailers and publicity, possibly accompanied by voluminous executable scripts such as JavaScript. The feature then allows to exclude one or more of these types of data from being stored in cache memory when a certain cache memory fill level threshold or stage is exceeded, and thus keeps space in cache memory to store more 'useful' data.

The device implementing the invention can indifferently be connected to a wired network such as the wired network 11 of FIG. 1, or to a wireless network (not shown). The wired networks or wireless networks can indifferently be of any type, such as based on Ethernet, WiFi, WiMAX or IEEE 1394 FireWire.

According to a particular variant embodiment, the cache memory controller takes into account the amount of data to be stored in the determination if the cache memory fill level exceeds one of the thresholds or stages that are defined according to the invention.

FIG. 2 shows an alternative embodiment of a receiver device 13 comprising an embodiment of the invention.

The user receiver device 13 comprises a Central Processing Unit (CPU) 220, a clock 230, a network interface 240, a graphics interface 250, a user interface 260, a Read-Only Memory (ROM) 200 and a Random Access Memory (RAM) 210. All of these components are interconnected via a data- and communication bus 270. CPU 220 controls the device 13 according to a program that is stored in ROM 200 in a memory zone 201. Clock device 230 provides the components of receiver 13 with a common timing in order to sequence and synchronize their operation. Network interface 240 receives and transmits data with external devices via connection 1010. Graphics interface 250 is connected to an external rendering device via connection 1019. User interface 2010 receives input commands from a user via connection 2010. Memory zone 201 comprises also instructions that implement the method of the invention. Upon powering on of device 13, CPU 220 copies the program 'Frog' from ROM memory zone 201 into memory zone 211 of RAM memory 210, and executes the copied program. Upon execution of the copied program, the program allocates memory space for variables needed for its execution in memory zone 214, and reserves a memory zone 212 to be used as cache memory. The device 13 is now started and upon reception of a request for audiovisual service application data, the method of the invention is activated. Memory zone 202 of ROM memory 200 comprises addresses of service portal, giving the user of the device 13 access to a last visited access portal for accessing an audiovisual services offering. Memory zone 203 comprises a list of preferred service offering providers.

Alternatively, device 13 comprises a specific memory zone for cache memory, which offers faster access than the 'standard' memory 210.

Alternatively, CPU 220 of device 13 comprises a specific memory zone for cache memory, which has the advantage of being a specific memory that can directly be accessed by CPU without using data- and communication bus 270 which is shared between the components 230,240,250,260, 200 and 210, thereby offering advantageously fast access.

FIG. 3 diagrammatically shows progressive or stagewise exclusion of data adding to cache memory as a function of various parameters such as preferred provider, type of data and cache memory fill level, according to various particular embodiments of the invention, each successive stage representing a threshold of cache memory fill level above which adding of data to the cache memory is more restrictive as cache fill level increases.

Line 305 represents a maximum cache memory fill level threshold or stage. Line 300 represents zero data in cache memory. 304, 303 and 302 represent respectively first, second and third cache memory fill level thresholds or stages of cache memory fill level. According to a variant embodiment of the invention, when cache memory fill level is between zero and the third threshold 302, there is no exclusion (310) of data adding to cache memory. According to a variant embodiment of the invention, when the cache memory fill level is between the third fill level 302 and a second fill level 303, adding of certain types of data from non-preferred providers is excluded. According to a variant embodiment of the invention, when cache memory fill level is between the second fill level 303 and a first fill level 304, adding of data from non-preferred providers is excluded. According to a variant embodiment of the invention, when cache memory fill level reaches above the first fill level 304, all data adding is excluded, thereby ensuring that cache fill level never reaches the maximum cache fill level. The invention is particularly interesting as an application 'on top of', 'piggyback' or 'front end' to an existing cache with its own existing cache management, offering all of the advantages of the invention among which avoiding reaching a full cache and thus avoids triggering the existing cache's own cache management, avoiding high delay times for adding data to cache and avoiding loss of control over which data is removed from the cache memory (e.g. existing cache management might very well remove data related to a privileged provider, since it is considered as being 'old data'). According to such an application of the invention, such a piggyback cache manager according to the invention comprises a controller that monitors each data add-remove operation so that it is perfectly aware of how many data is in the cache, and is able to manage the cache according to the invention.

Note that 'adding' of data is different from 'replacing' or 'updating' or 'refreshing' of data. For example, even if in zone 312 adding of data from non-preferred providers is excluded, replacement of existing data is still allowed. This is for example useful in a situation where obsolete version data is replaced by new version data.

FIG. 4 shows an algorithm implementing a particular embodiment of the method of the invention, implemented for example by the receiver device of FIG. 1, or by the receiver device of FIG. 2.

In a first step 400, variables and attributes are initialized that are used by the algorithm. These variables are for example stored in memory zone 214 of device 13 of FIG. 2, or in registers of memory controller 111 of FIG. 1. In a next step 401, a request for adding of data to cache memory is received. This request is for example received by cache memory controller 111 of device 12 of FIG. 1 via connection 1023, or by CPU 220 of device 13 FIG. 2 via communication bus 270. The origin of this request is for example a user initiated action while the user is navigating in a service offering presentation portal that gives the user access to audiovisual services. Such a user initiated action is then received for example via an input device in receiver 12 of FIG. 1 (input device not shown) or via connection 2010 and user interface 260 of device 13 of FIG. 2. In a next step 403, it is determined if the service provider from which the data originates is in a list of preferred service offering providers, said list being for example present in ROM memory zone 203 of device 13. If it is determined in step 403 that the service provider from which the data originates is in a list of preferred service offering providers, the data is added to the cache memory unless adding to cache memory of data is excluded, where after the algorithm proceeds with step 307. On the affirmative, the algorithm proceeds with step 405 of adding of data unless adding of data is excluded. If however it is determined in step 403 that the service provider from which the data originates is NOT in the list of preferred service offering providers, the data is not added, and the algorithm proceeds with step 401 of awaiting a reception of a data add request.

The determination steps of exceeding of cache fill level with regard to the different thresholds according to the different variants of the invention are for example done by cache controller 111 of FIG. 1 that determines the cache fill level of cache memory 111 via connection 1021, or with reference to FIG. 2, by CPU 220 that determines the fill level of cache memory zone 212 via signals exchanged on data- and communication bus 270.

According to a particular embodiment of the invention, the different thresholds, maximum cache memory fill level and cache memory size are predetermined by the receiver device manufacturer and stored in a non-volatile memory zone of the receiver device, e.g. in ROM memory 200 of device 13 of FIG. 2. According to a variant embodiment, the thresholds, maximum cache memory fill level and cache memory size are specified as an absolute value (e.g. the first threshold is specified as 7.9 Mbyte, the maximum cache memory fill level is specified as 9.9 Mbyte) or, according to a different variant, the different thresholds and maximum cache memory fill level are specified as a relative value related to the cache memory size (i.e. the first threshold is specified as being 79% of cache memory size).

According to a variant embodiment of the invention, the different thresholds and optionally cache memory size are alterable by a remote configuration device, for example by a configuration server of a service offering provider, through a remote configuration protocol such as SNMP (Simple Network Management Protocol) or TR-069 (Technical Report 069). This is particular advantageous, as the service offering provider can remotely tailor the size of the cache memory to the size of the data corresponding for example to the added size of all data related to the audiovisual service offering presentation application (also called access portal), so that the cache memory is of sufficient size to contain all of the data of that application and the receiver device never has to download twice the same data since it is sure to be stored in cache memory, i.e. when the complete application tree of the said application has once been traversed completely, all subsequent traversals can be satisfied with data from cache memory. When the service offering provider updates the access portal, it can adapt the cache memory size to the total size of the updated access portal by transmitting a dedicated configuration command to the receiver device.

According to a particular embodiment of the invention, the thresholds maximum cache memory fill level and cache memory size are determined according to a rule of thumb. For example, cache memory size is fixed to a value allowing to contain at maximum one hundred web pages of typical size, and the first threshold is fixed to 69 percent of cache memory size, and each subsequent threshold adds 10 percent to the value fixed for the first threshold, thus 79 percent of maximum cache memory size for the second threshold, 89 percent of cache memory size for the fourth threshold, and 99 percent of cache memory size for the fourth threshold.

According to a variant embodiment of the invention, the thresholds and possibly the cache memory size are tailored to the type and size of data to be stored in cache memory. For example, if the cache memory should be able to store VoD trailers, the cache memory size is relatively large, and the thresholds are spaced in such a manner that the cache memory space between two subsequent thresholds is sufficient to hold at least several items of a specific data type, such as Video on Demand images. According to a variant embodiment, various data types of data from non-privileged providers influence differently on the cache memory policy. For example, if the cache memory is large enough to store VoD trailers, adding to cache memory of this type of data will be disabled if the cache memory fill level is superior to the third threshold and inferior to the second threshold, before excluding the adding to cache memory of less voluminous VoD image data when a specific threshold is met that lays between the third and second threshold. According to a variant embodiment, the thresholds and optionally cache memory size are determined in an empirical manner, based on typical use of the receiver device implementing the invention. This has the advantage, to allow optimization of the cache memory so that it is tailored to typical use of the receiver device.

According to a particular embodiment, the invention is entirely implemented in hardware, for example as a dedicated component (for example as an ASIC, FPGA or VLSI) (respectively «Application Specific Integrated Circuit», «Field-Programmable Gate Array» and «Very Large Scale Integration») or as distinct electronic components integrated in a device or in a form of a mix of hardware and software.

The invention claimed is:

1. A method of cache memory management implemented in a receiver device, said method comprising:
   stagewise excluding adding data to said cache memory as cache memory fill level increases, said stagewise excluding comprising determining, for each successive stage of cache memory fill level, exclusion of said data from being added to said cache memory according to rules of exclusion of adding data to said cache memory that are increasingly restrictive.

2. The method according to claim 1, wherein one of the rules specifies that excluding adding data to said cache memory if said cache memory fill level is higher than a first stage of cache memory fill level that is lower than a maximum stage of cache memory fill level.

3. The method according to claim 1, further comprising:
   maintaining a list of preferred service offering providers in said receiver device, and determining if a service provider from which said data to add originates is in said list; and
   if it is determined that said service offering provider is not in said list and said cache memory fill level is under a second stage of cache memory fill level that is lower than a first stage of cache memory fill level, and if it is determined that a data type of said data is in a list of preferred data types, said list of preferred data types being present in said receiver device, adding said data to said cache memory.

4. The method according to claim 3, further comprising:
   if said cache memory fill level is under a third stage of cache memory fill level that is lower than said second stage of cache memory fill level, adding said data to said cache memory.

5. The method according to claim 3, wherein said list of preferred data types comprises said image data.

6. The method according to claim 3, wherein said list of preferred data types comprises said executable script data.

7. The method according to claim 3, wherein said determining if said service offering provider from which said data originates is in said list of preferred service offering providers comprises comparing a Unified Resource Locator present in said request with said Unified Resource Locators of said preferred service offering providers in said list of preferred service offering providers.

8. The method according to claim 3, wherein said determining if said service offering provider from which said data originates is in said list of preferred service offering providers comprises comparing an Internet Protocol address present in a request for adding said data, indicating an origin of said data, with Internet Protocol addresses of said preferred service offering providers in said list of preferred service offering providers.

9. A device for management of cache memory, said device comprising:
   a network interface configured to receive a request for adding data to said cache memory;
   a controller configured to stagewise exclude adding data to said cache memory as cache memory fill level increases, and
   said controller being further configured to determine said stagewise exclusion for each successive stage of cache memory fill level, according to rules of exclusion of adding data to said cache memory that are increasingly restrictive.

10. The device according to claim 9, wherein one of the rules specifies that excluding adding data to said cache memory if cache memory fill level is higher than a first stage of cache memory fill level that is lower than a maximum stage of cache memory fill level.

11. The device according to claim 9, further comprising:
    a memory configured to store a list of preferred service offering providers, and a processor configured to determine if a service provider from which said data to be added originates is in said list; and
    said processor being further configured to determine if said service offering provider from which said data to be added is not in said list and said cache memory fill level is under a second stage of cache memory fill level that is lower than a first stage of cache memory fill level, and if it is determined by said controller that a data type of said data is in a list of preferred data types, said list of preferred data types being present in said device, said controller adds said data to said cache memory.

12. The device according to claim 11, wherein said controller is further configured to determine if said cache memory fill level is under a third stage of cache memory fill level that is lower than said second stage of cache memory fill level, and to add said data to said cache memory if it is determined that said cache memory fill level is under a third stage of cache memory fill level that is lower than said second stage of cache memory fill level.

13. The method according to claim 1, wherein said rules of exclusion of adding data to said cache memory are increasingly restrictive as a function of at least one of an origin of data and a type of data, said type of data comprising image data, movie trailer data, and executable script data.

14. The device according to claim 9, wherein said rules of exclusion of adding data to said cache memory are increasingly restrictive as a function of at least one of an origin of data and a type of data, said type of data comprising image data, movie trailer data, and executable script data.

\* \* \* \* \*